United States Patent
Yazdani et al.

(10) Patent No.: US 12,361,689 B1
(45) Date of Patent: Jul. 15, 2025

(54) SYSTEM AND METHOD FOR AUGMENTING AUTONOMOUS VEHICLE TRAINING DATA

(71) Applicant: Gatik AI Inc., Mountain View, CA (US)

(72) Inventors: Amir Yazdani, Mountain View, CA (US); Apeksha Kumavat, Mountain View, CA (US); Gautam Narang, Mountain View, CA (US); Arjun Narang, Mountain View, CA (US)

(73) Assignee: Gatik AI Inc., Mountain View, CA (US)

( * ) Notice: Subject to any disclaimer, the term of this patent is extended or adjusted under 35 U.S.C. 154(b) by 0 days.

(21) Appl. No.: 18/975,322

(22) Filed: Dec. 10, 2024

(51) Int. Cl.
| | |
|---|---|
| *G06V 10/774* | (2022.01) |
| *B60W 50/00* | (2006.01) |
| *B60W 60/00* | (2020.01) |
| *G06T 11/00* | (2006.01) |
| *G06V 10/77* | (2022.01) |
| *G06V 20/40* | (2022.01) |
| *G06V 20/64* | (2022.01) |

(52) U.S. Cl.
CPC ......... *G06V 10/7747* (2022.01); *B60W 50/00* (2013.01); *B60W 60/001* (2020.02); *G06T 11/00* (2013.01); *G06V 10/7715* (2022.01); *G06V 20/41* (2022.01); *G06V 20/64* (2022.01); *B60W 2050/0028* (2013.01); *G06T 2210/61* (2013.01)

(58) Field of Classification Search
CPC .......... G06V 10/7747; G06V 10/7715; G06V 20/41; G06V 20/64; B60W 50/00; B60W 60/001; B60W 2050/0028; G06T 11/00; G06T 2210/61
USPC ......................................................... 701/25
See application file for complete search history.

(56) References Cited

U.S. PATENT DOCUMENTS

| 11,958,500 B1* | 4/2024 | Uhlig .................. G06V 10/771 |
| 2023/0080803 A1* | 3/2023 | Holland ................. H04N 23/80 |
| | | 348/222.1 |

FOREIGN PATENT DOCUMENTS

| WO | WO-2023211609 | * 11/2023 |
| WO | WO-2024163624 | * 8/2024 |

* cited by examiner

*Primary Examiner* — Muhammad Shafi
(74) *Attorney, Agent, or Firm* — Jeffrey Schox; Diana Lin

(57) ABSTRACT

In variants, a method for generating synthetic data can include: determining an initial dataset, determining characteristics of the initial dataset, generating a set of prompts based on the characteristics, prompting a model to generate the synthetic data using the set of prompts, and training an AV model using the synthetic data.

19 Claims, 4 Drawing Sheets

SYSTEM AND METHOD FOR AUGMENTING AUTONOMOUS VEHICLE TRAINING DATA

TECHNICAL FIELD

This invention relates generally to the autonomous vehicle field, and more specifically to a new and useful system and method for generating training data in the autonomous vehicle field.

DETAILED DESCRIPTION

The following description of the embodiments of the invention is not intended to limit the invention to these embodiments, but rather to enable any person skilled in the art to make and use this invention.

1. Overview

Figure 1:
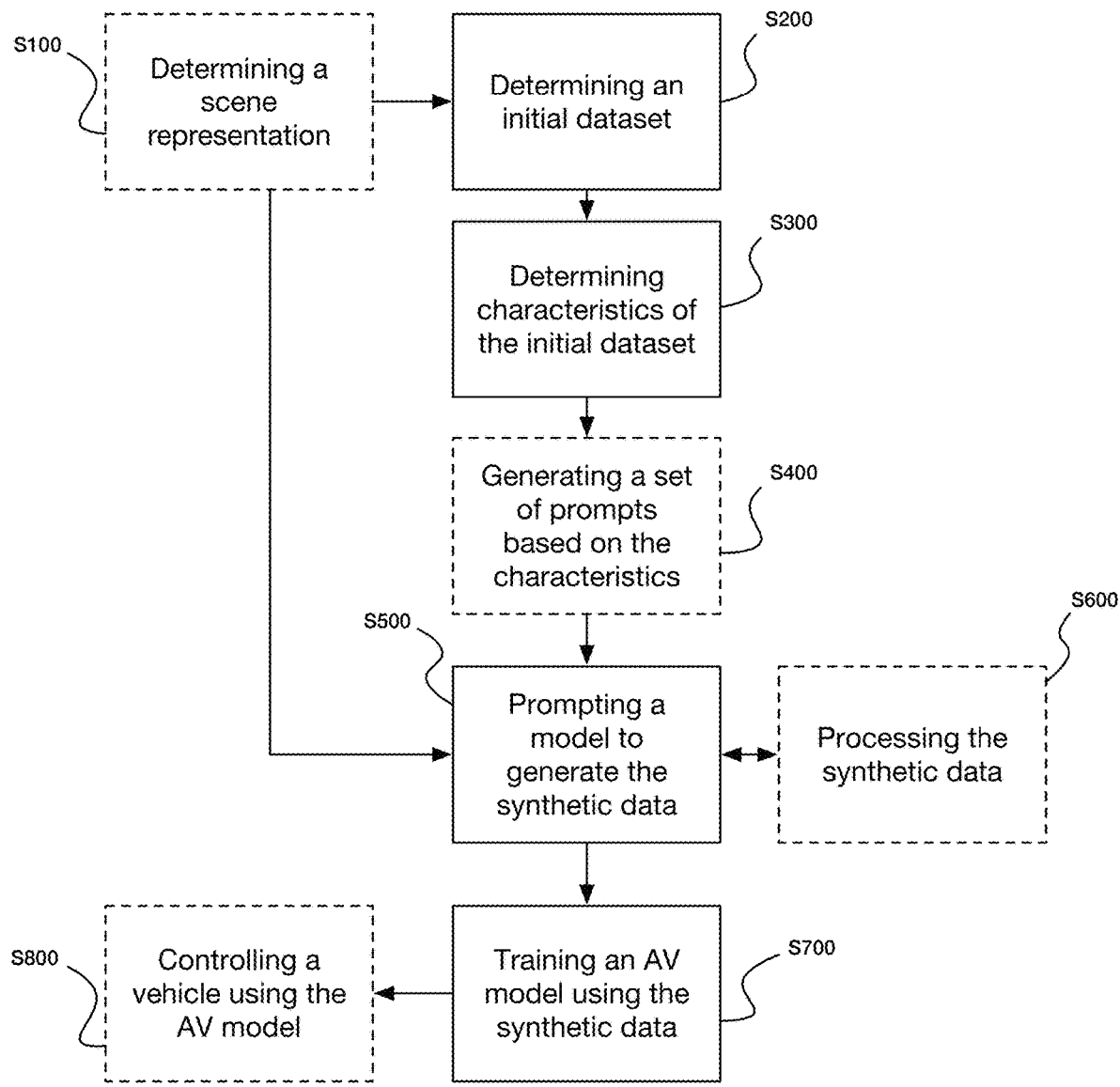
FIG. 1 is a schematic representation of a variant of the method.

As shown in FIG. 1, variants of the method can include: determining an initial dataset S200; determining characteristics of the initial dataset S300; generating a set of prompts based on the characteristics S400; prompting a model to generate the synthetic data S500; and training an AV model using the synthetic data S700. The method can optionally include: determining a scene representation S100, wherein the scene representation is used to generate the synthetic data; processing the synthetic data S600; and/or controlling a vehicle using the AV model S800. The method functions to augment a training data set to ensure adequate feature coverage, sufficient training data volumes, sufficient data density, and/or confer other benefits.

Figure 2:
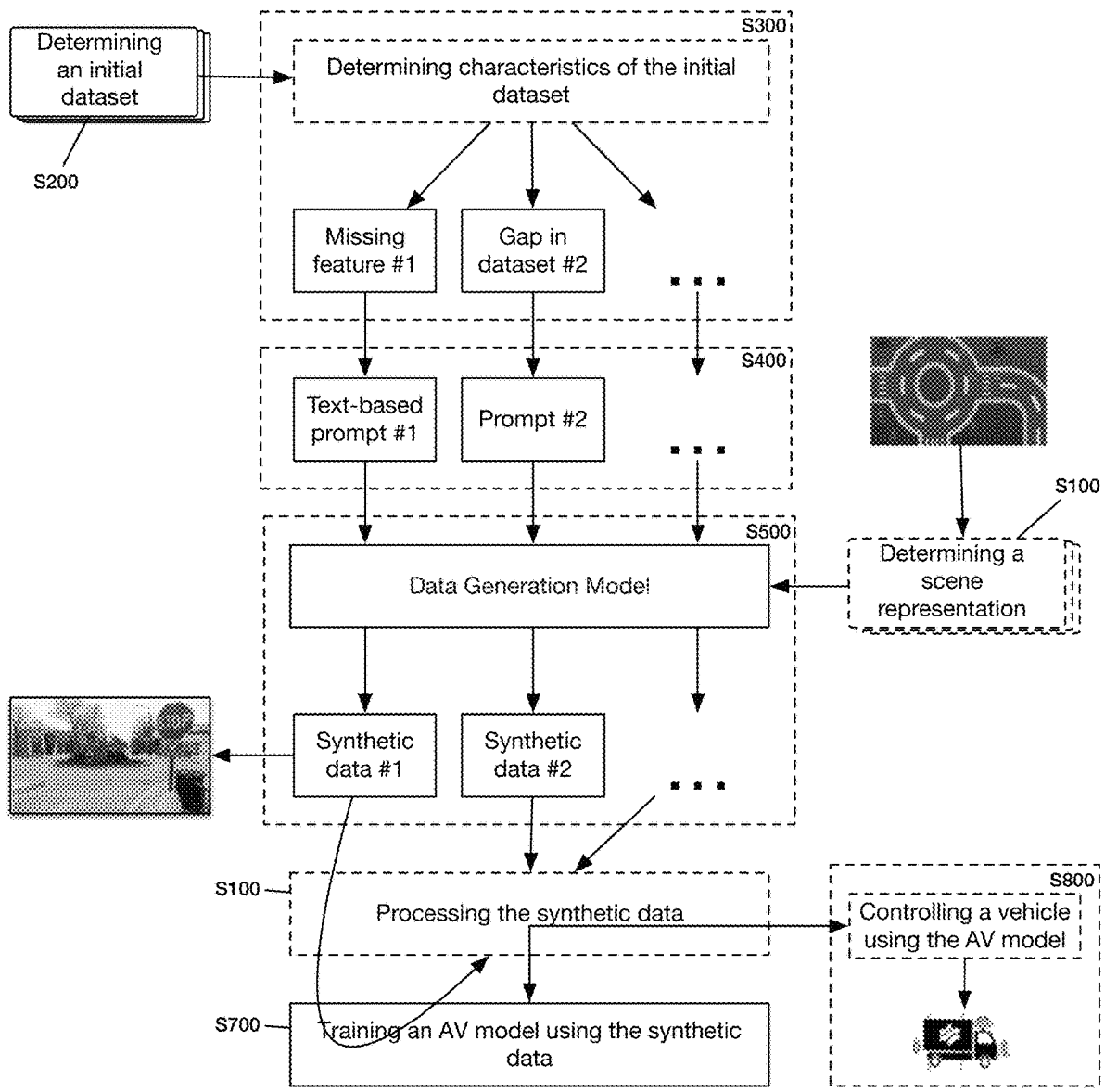
FIG. 2 is an illustrative example of a variant of the method.
Figure 4:
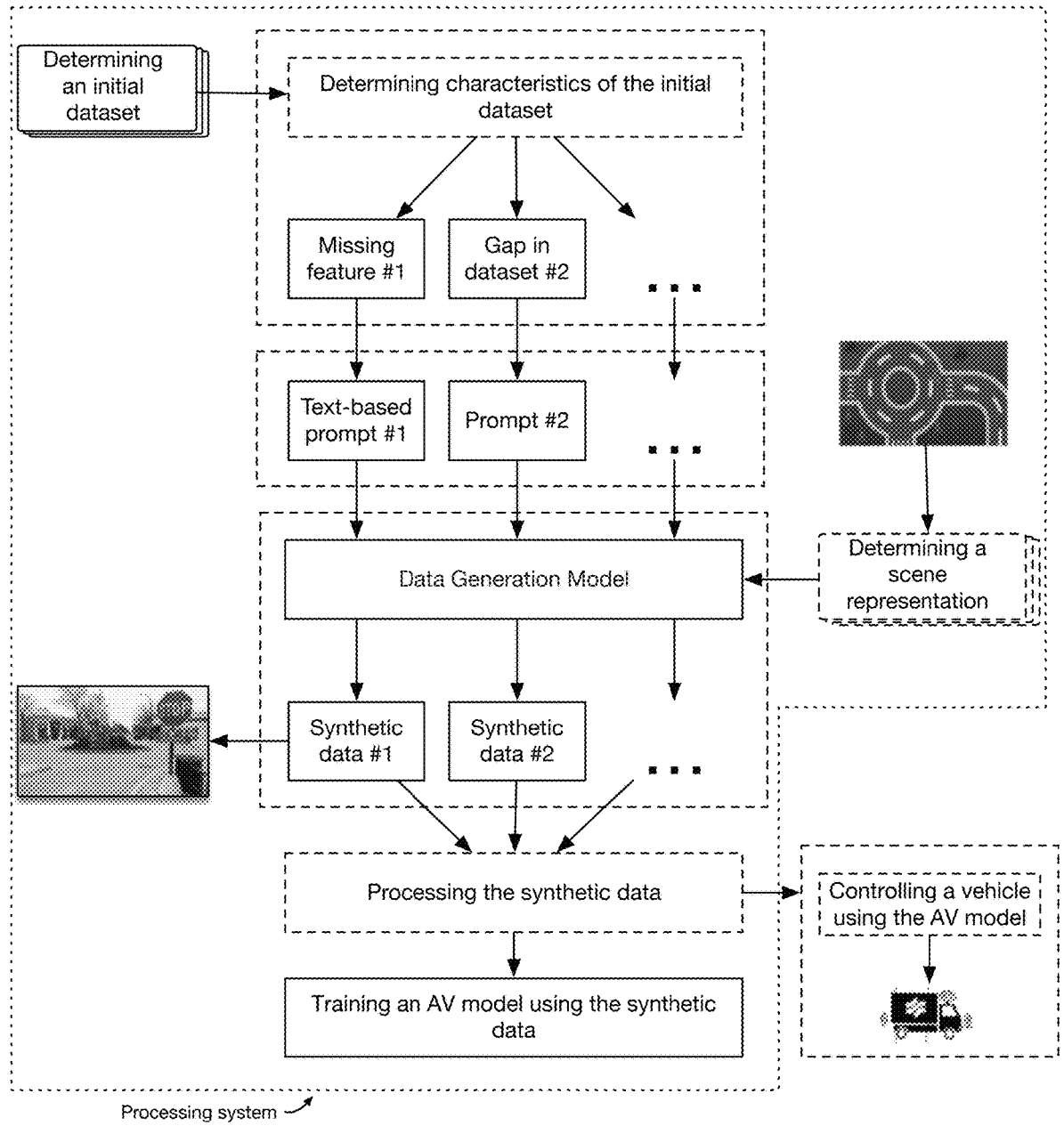
FIG. 4 is an illustrative example of a variant of the method performed using a processing system.

In an illustrative example, the method can include: determining an initial dataset S200 for a real-world scene (e.g., a geolocation along a predetermined route, etc.); determining characteristics of the initial dataset S300 (e.g., manually or automatically determining gaps in the dataset, missing features, etc.); generating a set of prompts S400 based on the characteristics (e.g., text-based prompts, etc.); and prompting a generative model S500 using the set of prompts to generate synthetic data (e.g., video, images, depth maps, etc.); and training an AV model using the synthetic data S700 and optionally the initial dataset. Examples are shown in FIG. 2 and FIG. 4. In variants, the method can generate synthetic data specific to the scene (e.g., the geolocation) by providing a scene representation of the real-world scene (e.g., a 3D representation of the scene's static elements, a scene graph, a scene image, etc.) to the generative model as part of the prompt or prompt context. In variants, the generated synthetic dataset can be analyzed to minimize hallucination by detecting and removing unrealistic data (e.g., using a validation model, by extracting features from individual frames and identifying hallucinations based on heuristics, etc.). The trained AV model (e.g., behavior model) can be used to control an autonomous vehicle (AV) operation within a real-world scene.

2. Technical Advantages

Variants of the technology can confer one or more advantages over conventional technologies.

First, variants of the technology can generate synthetic data that resemble realistic scenarios, which can fill in gaps in existing datasets and/or augment them with higher volumes of training data. This capability addresses the significant challenge of missing features in training data, such as rare events or unobserved scenarios, which are crucial for developing effective autonomous vehicle (AV) models. For example, the technology can analyze the available training dataset, identify deficiencies, automatically generate prompts to create synthetic data to rectify these deficiencies, and prompt one or more generative models to produce the synthetic data. This process ensures a more comprehensive dataset that captures a wide range of driving conditions, enabling av systems to make more informed decisions in diverse situations.

Second, variants of the technology can customize the synthetic data to focus on specific, critical scenarios, enhancing the model's ability to learn from relevant information. This targeted approach ensures that behavioral models and/or teleoperation drivers can effectively handle unexpected situations, as they have been trained on similar data. For example, the technology can generate synthetic data representing rare weather conditions or complex traffic scenarios, allowing the AV model to learn and adapt to these challenging situations without the need for extensive real-world data collection.

Third, variants of the technology can minimize hallucinations (e.g., unrealism) by using real-world data patterns, resulting in outputs that closely mimic actual conditions and improving the model's ability to generalize across diverse scenarios. For example, the synthetic data can be validated against the prompt or heuristics before being used for AV model training. This feature can be in the context of AV systems, where accurate representation of the environment is crucial for safe and effective operation. By generating synthetic data that closely resembles real-world conditions, the technology helps ensure that the AV model's training is grounded in realistic scenarios, reducing the risk of unexpected behavior in real-world applications.

Fourth, synthetic data generation offered by the technology is more cost-effective and time-efficient than collecting extensive real-world data, especially for challenging or rare scenarios that are difficult to capture. This advantage allows for controlled experimentation and investigation of various parameters and their effects on model performance. For instance, researchers can generate synthetic data representing different road conditions, traffic densities, or vehicle behaviors to systematically evaluate the AV model's performance under various circumstances. Moreover, this approach ensures that the resultant model is trained on a robust dataset, minimizing bias, overfitting, and other model training issues that can arise from limited or imbalanced real-world data.

Fifth, variants of the technology can support continuous learning by providing new training data for ongoing model refinement. This capability is particularly valuable in the rapidly evolving field of autonomous vehicles, where new scenarios and challenges constantly emerge. By generating up-to-date synthetic data, the technology enables AV models to adapt to changing environments, regulations, and technological advancements without the need for constant real-world data collection. This continuous learning process helps maintain the model's relevance and effectiveness over time, ensuring that av systems remain at the forefront of safety and performance.

However, further advantages can be provided by the system and method disclosed herein.

3. Method

As shown in FIG. 1, in variants, the method can include: determining an initial dataset S200; determining characteristics of the initial dataset S300; generating a set of prompts based on the characteristics S400; prompting a model to generate the synthetic data S500; and training an AV model using the synthetic data S700. The method can optionally include: determining a scene representation S100, wherein the scene representation is used to generate the synthetic data; processing the synthetic data S600; and/or controlling a vehicle using the AV model S800. The method functions to augment a training data set to ensure adequate feature coverage, sufficient training data volumes, sufficient data density, and/or confer other benefits. The method can function to control autonomous vehicle operation using an AV model trained on the augmented training data set. For example, the AV model can be a behavior model, object detector, and/or any other suitable model.

The method can generate training datasets specific to a scene, but can additionally or alternatively generate training datasets that are not specific to a scene. For example, the scene-specific training datasets can include all or most of the scene's static and/or dynamic elements, include the scene geometry, and/or any other suitable scene-specific elements.

The method can be performed: once, for each scene, when a new scene (e.g., geolocation) or scene class needs to be supported, when a new route is initialized, when new data for a given scene is available, when a characteristic of the training data satisfies a condition, when a new capability needs to be supported, when a characteristic of the training data (e.g., volume, diversity, density, etc.) satisfies a condition (e.g., falls below a threshold), and/or at any other suitable time. In variants, the method can be repeated for each of a plurality of real-world scenes (e.g., geolocations) along a route (e.g., fixed route, predetermined route, etc.).

The method can be performed by: a remote computing system, an onboard processing system, and/or by any other suitable system.

The method can optionally include determining a scene representation S100, which functions to provide context for a specific scene. S100 can be performed by: the platform, user, a remote computing system (e.g., performing the dataset augmentation), a set of autonomous vehicles (e.g., traversing through the scene), and/or any other suitable entity. S100 can be performed: once, every time a model is being trained, every time synthetic data for a new scene needs to be generated, every time a new route (e.g., fixed route) is initialized, when new data for a given scene is available, and/or at any other suitable time. S100 can be determined independent of S200-S400, determined based on the initial dataset (e.g., from S200), and/or performed at any other suitable time.

The scene can be a route, geolocation, a location associated with a predetermined scene class (e.g., intersection, cloverleaf, freeway, off-ramp, 2-lane road, 4-lane road, 1-way road, etc.), location associated with a location attribute parameter satisfying a threshold (e.g., historical risk above a threshold, etc.), and/or any other suitable location. The scene is preferably a real-world scene, but can alternatively be a synthetic scene. For example, the real-world scene is preferably associated with a geolocation (e.g., along a fixed route), but can alternatively be associated with a scene type (e.g., intersection, freeway, cloverleaf, etc.), and/or any other suitable location or attribute thereof. An example is shown in FIG. 2. In a specific example, S100 can include determining scene representations for each of a series of geolocations lying along a route (e.g., a predetermined, fixed route).

The scene is preferably the scene(s) depicted in the initial dataset (from S200), but can alternatively be another scene. The scene can include static elements (e.g., persistent elements), dynamic elements, and/or any other suitable elements. For example, static elements can include: lanes, intersections, stop signs, traffic lights, road markings, curbs, and/or any other suitable static elements. For example, dynamic elements can include: pedestrians, vehicles, animals, and/or any other suitable dynamic elements.

The scene representation can be representative of the scene. The scene representation preferably represents the static scene elements (e.g., static elements, etc.), but can additionally or alternatively represent the dynamic scene elements, both the static and dynamic scene elements, and/or other scene elements. The scene representation can represent: only static elements within the scene (e.g., traffic lights, lanelets, etc.); static and dynamic elements within the scene (e.g., lanes, intersections, vehicles, pedestrians, etc.); only dynamic elements within the scene; and/or any other suitable elements. The scene representation can additionally or alternatively represent attributes of the scene, such as the lighting conditions, weather, and/or other attributes. For example, the scene representation can include scene elements (e.g., class, measurement segment, location, kinematics, size, scale, occlusion, deformations, etc.); conditions (e.g., lighting, brightness, weather, background, contrast, background complexity, scene gradients, etc.); spatial variability (e.g., perspectives, angles, rotation, etc.); texture; driving context; temporal variability (e.g., duration, etc.); sensor data (e.g., exposure, white balance, color, channel, etc.); events; noise; embeddings thereof; data modalities (e.g., image, video, audio, etc.); and/or any other suitable features.

The scene representation can include: a geometric representation (e.g., point cloud, mesh, set of surfaces, set of surface normals, depth map, lidar map, etc.), an audio-visual representation (e.g., audio, video, images, etc.), and/or any other suitable representation in any other suitable modality (e.g., heatmap, kinematic measurements, etc.), a scene graph, and/or any other suitable representation. For example, when the scene representation is a scene graph, different nodes represent different scene elements (e.g., and attributes thereof, such as pose, type, kinematics, etc.), and different edges represent relationships (e.g., physical relationships, risk relationships, behavioral relationships, etc.) between the scene elements represented by the nodes, wherein the relationships can be predicted, learned, heuristically assigned, manually determined, and/or otherwise determined. The scene representation can be 3D, 2D, and/or have any other suitable dimensionality.

The scene representation can be associated with a scene identifier (e.g., latitude/longitude, what3words identifier, internal location identifier, etc.). The scene representation can be associated with a perspective or be perspective agnostic.

The scene representation can be: measured at the real-world scene (e.g., from LIDAR measurements, stereocamera measurements, etc.), extracted from measurements of the scene (e.g., from the initial dataset, etc.), synthetically generated, retrieved from storage, manually modeled, and/or otherwise determined.

However, S100 may be otherwise performed.

Determining an initial dataset S200 functions to determine a training dataset for augmentation. The initial dataset S200 can be a training dataset (e.g., used to train an autonomous vehicle model, etc.) or be any other dataset.

S200 can be performed by: platform or a remote computing system (e.g., performing the dataset augmentation), a set of autonomous vehicles (e.g., traversing through the scene), be manually performed, and/or any other suitable system. S200 can be performed: post-data collection, before training a model, every time a model is being trained, every time the platform receives new data, every time there is an update to the current dataset, when developing AV models, and/or at any other suitable time.

The initial dataset can be real-world data (e.g., captured during traversal through the real-world scene), historical data (e.g., data captured from web-scraping/crowdsourcing), synthetic data (e.g., simulations of real-world scenes), hybrid data (e.g., using augmented reality to overlay real-world settings), and/or any other suitable type of data. Data within the dataset can include: measurements, features extracted from the measurements, and/or other data representative of a scene. For example, the data can include videos, images, audio, lidar data, sensor fusion data, metadata (e.g., annotations, timestamps, vehicle states, and environmental conditions associated with the video or sensor data), simulation data, trajectory data, heatmaps, and/or any other suitable data type.

Data within the initial dataset can be from the same perspective relative to the scene or from different perspectives. The initial dataset can be specific to a scene or include multiple scenes. The initial dataset can be associated with: a set of metadata, features, and/or other information. The metadata can be associated with the data sampling context or be otherwise determined. Examples of metadata can include capture time, sensor settings during capture, sensor type, ambient lighting, ambient weather, and/or any other suitable metadata. Features of the data can be extracted in S300 or be otherwise determined.

In a first variant, the initial dataset is specific to a route or a set of routes.

In a second variant, the initial dataset is specific to a location within a route. This can include: waypoints, landmarks, intersections, street addresses, traffic signals, rest stops, checkpoints, curves and turns, elevation changes, and/or any other suitable location-specific data.

In a third variant, the initial dataset includes data from a plurality of locations. The plurality of locations can have the same or different scene class. The plurality of locations can be along the same or different route (e.g., fixed route, predetermined route, etc.).

The initial dataset can be: sampled (e.g., measured), retrieved, extracted, and/or otherwise determined. In a first variant, S200 can include sampling or retrieving measurements of a real-world scene. For example, measurements can be sampled by autonomous vehicles traversing through the scene. In another example, measurements can be sampled during a scene survey. In a second variant, S200 can include extracting or retrieving features of a scene.

However, S200 may be otherwise performed.

Determining characteristics of the initial dataset S300 functions to identify characteristics of interest in the initial dataset. For example, S300 can determine deficiencies in the initial dataset, such as underrepresented values, missing regions of the input data, and/or other deficiencies (e.g., examples shown in FIG. 2).

S300 can be performed by a platform, a user (e.g., manually), and/or by any other suitable entity. S300 can be performed after determining initial dataset, after visualizing initial dataset, before training a model, every time a model is being trained, every time the platform receives new data, every time there is an update to the current dataset, and/or at any other suitable time.

The characteristics can be characteristics of the features from the initial dataset, and/or any other suitable characteristics. The characteristics can include feature distribution (e.g., gaps in the distribution), class distribution, missing data (e.g., missing values from a set of expected values), domain coverage, performance gaps, feature correlations, statistical summaries (e.g., outliers, edge cases, statistical representation, z-scores, etc.), sparsity, data imbalance, labeling errors, noise, inconsistency, outliers, overrepresented values, missing data rate, pattern of missingness (e.g., MCAR metrics, MAR metrics, etc.), multiple imputation, and/or any other suitable characteristics. In a first example, the identified characteristics can include regions of a feature distribution with sparse data density (e.g., value ranges with less than a threshold data density); feature values outside of a feature distribution (e.g., scenarios that are not represented in the initial dataset); sparse or unrepresented feature value combinations; highly correlated features; and/or any other suitable characteristics. In a second example, the characteristics can be the features themselves. However, the characteristics can be otherwise defined.

The characteristics can be specific to a feature or for multiple features. The characteristics can include or be associated with: a characteristic identifier (e.g., "feature distribution"; a semantic identifier for the feature itself, such as "pedestrian", etc.), a set of values (e.g., sparse feature values, edge case values, outliers, etc.), and/or any other suitable information.

The characteristics can be determined using: data distribution analysis (e.g., density plots, histograms, etc.), error analysis on validation sets, feature value clustering, error clustering, root cause analysis, model uncertainty (e.g., using the confidence score output during model inference to identify inputs that should be augmented), cross-domain testing, anomaly detection (e.g., using isolation forests, SVMs, etc.), and/or any other suitable methods.

The features are preferably attributes of a driving context (e.g., including the scene and set of dynamic elements), but can alternatively be features of autonomous vehicle control, and/or be any other suitable feature. Examples of features that can be used include: scene elements (e.g., class, measurement segment, location, kinematics, size, scale, occlusion, deformations, etc.); conditions (e.g., lighting, brightness, weather, background, contrast, background complexity, scene gradients, etc.); spatial variability (e.g., perspectives, angles, rotation, etc.); texture; driving context; temporal variability (e.g., duration, etc.); sensor data (e.g., exposure, white balance, color, channel, etc.); events; noise; embeddings thereof; data modalities (e.g., image, video, audio, etc.); and/or any other suitable features.

In variants, the features can include tags. The tags can include: feature values, metadata values, initial datum identifier, and/or any other suitable information. Tags can be automatically assigned from the initial datum, extracted from the feature values, and/or otherwise determined.

The features can be extracted using object detectors, classifiers, filters segmentation algorithms, DNNs (e.g., transformers, LLMs, etc.), anomaly detectors, encoders, and/or any other suitable methods.

Each feature can be associated with a feature identifier (e.g., a name), a value, an identifier for the source datum, metadata (e.g., tags), prompt content, and/or other information.

The prompt content is preferably used to generate the prompt in S400, but can be otherwise used. The prompt content is preferably descriptive of the feature and/or the feature value, but can alternatively be descriptive of the characteristic (e.g., higher-level feature analysis), and/or describe any other suitable information. The prompt content can include: the feature class, feature value, feature description, and/or any other suitable information. The prompt content can include: text descriptions, numerical values, embeddings, tokens, vectors, images, audio, video, and/or any other suitable content. The prompt content can be determined manually, automatically, and/or in any other suitable manner. In a first example, when the feature is an SUV detected within the initial datum, the prompt content can include: the "SUV" class, "vehicle" class, the size of the SUV (e.g., numerical values), the shape of the SUV (e.g., a convex hull), audio for the SUV (e.g., horn honking, driving by, etc.), range of speed values, range of acceleration values, and/or other prompt content.

S300 can be performed by extracting features from each datum of the initial dataset and generating initial dataset characteristics by analyzing the extracted features.

In a first variant, using data visualization techniques (e.g., using a histogram of the distribution, scatter plots, box plots, heatmap, etc.), S300 can identify features at the tail ends of the distribution or outliers in the visualization which indicate gaps in the dataset.

In a second variant, using statistical methods, S300 can calculate summary statistics to see if certain segments of the data are underrepresented.

In a third variant, S300 can segment data by relevant categories or tags to analyze the count or mean in each segment.

In a fourth variant, S300 can include manually calculating, annotating, and/or labeling gaps or missing features in the dataset.

In a fifth variant, S300 can include visualizing the dataset. Visualizing the dataset functions to create a visual representation of the dataset to examine distribution of the training data. In a first variant, the visualization can be a histogram (e.g., displaying the distribution of the data, to understand the frequency of certain data, etc.). In a second variant, the visualization can be plots (e.g., box plots, scatter plots). In a third variant, the visualization can be 3D visualizations (e.g., for lidar data). In a fourth variant, the visualization can be geospatial mapping (e.g., using GIS tools to map the data spatially, visualizing driving routes and identifying areas with sparse coverage, etc.).

However, determining characteristics of the initial dataset S300 may be otherwise performed.

Generating a set of prompts based on the characteristics S400 functions to generate prompts based on the characteristics of the initial dataset (e.g., example shown in FIG. 2). S400 can function to fill in gaps in the initial dataset, generate more data to increase data volume while preserving the initial data distribution, and/or any other suitable function.

The prompt can include: text, tensors, audio, images, videos, point clouds, graphs, file identifiers (e.g., pointers, URI, etc. to content that can be used for generation), and/or any other suitable modality or combination thereof. S400 can be performed by a platform, user, generative model, and/or any other suitable entity. S400 can be performed after determining characteristics of initial dataset, after visualizing initial dataset, before training a model, every time a model is being trained, every time the platform receives new data, every time there is an update to the current dataset, and/or at any other suitable time.

In variants, S400 can include identifying underrepresented features in the initial dataset based on the characteristics and generating a synthetic data prompt to rectify the underrepresentation. The synthetic data prompt can be determined based on the underrepresented values for a single feature, multiple features (e.g., using different permutations of feature values), and/or otherwise determined. However, the prompt can be generated based on any other suitable characteristic of the data. Underrepresented features can include: gaps, sparse data, highly correlated features, rare scenarios, and/or other underrepresented features. Underrepresented features can be identified by plotting the feature values and identifying gaps or dips (e.g., missing values, biases, outliers, etc.); clustering the feature values to identify sparse regions, clustering the feature embeddings to identify sparse regions; identifying edge values (e.g., values with a low prevalence in the feature value set); and/or any other suitable method.

Generating the synthetic data prompt can include: identifying the features associated with the underrepresented characteristic; retrieving the prompt content for the identified feature (e.g., retrieving the feature identifier or feature name, etc.); identifying the underrepresented data values; optionally determining the prompt content for the data values (e.g., determining a descriptor for the values, determining the values themselves, etc.); and crafting a prompt based on the prompt content for the identified features and the identified values (e.g., prompt content for the identified values). The prompt content can be selected based on the prompt type, the generative model used in S500 (e.g., based on the input modalities that the model can accept), based on the desired synthetic data modality, and/or any other suitable criteria. Alternatively, the prompt content values can be randomly generated (e.g., within constraints determined based on the underrepresented characteristics). For example, S300 can automatically generate permutations of feature values to include in the prompt.

The prompt can also be generated based on the scene representation (e.g., from S100), and/or any other suitable information. In a first variant, the prompt can include the scene representation as part of the prompt or prompt context. For example, the prompt can include a scene graph of the scene, an image of the scene, a 3D representation of the scene, and/or any other suitable scene representation. In a second variant, the prompt can include a scene representation identifier (e.g., a pointer, a URI, etc.), wherein the generative model can retrieve the scene representation using the scene representation identifier (e.g., from a remote database, from a vector database, etc.). However, the scene representation can be otherwise passed to the generative model alongside the prompt.

Crafting the prompt can be performed in various ways. In a first variant, crafting the prompt can include filling in a predetermined prompt template using the prompt content (e.g., feature identifier and values). The prompt template can be manually selected, selected based on the initial data modality, selected based on the input data modality of the model, and/or otherwise determined. In a second variant, crafting the prompt can include using a generative model to generate a text-based prompt based on each of the identified missing characteristics within the initial dataset. In a third variant, crafting the prompt can include receiving a text-based prompt from a user. In a fourth variant, crafting the prompt can include receiving a user specified prompt (e.g., through a GUI-based selection) that can be converted into text. In a fifth variant, crafting the prompt can include compositing the prompt content with the scene representation. In an example, determining the prompt can include automatically filling out a prompt template with a name of the underrepresented feature, underrepresented values for the underrepresented feature, optionally a hyperparameter (e.g., data volume; determined in S400; etc.), and/or other feature information.

However, S400 may be otherwise performed.

Prompting a data generation model to generate synthetic data S500 functions to generate synthetic data to augment the initial training data set.

S500 can be performed by a platform, by a user, and/or by any other suitable entity. S500 can be performed using a generation model API call, chat interface, and/or any other suitable interface.

S500 can be performed every time a discrepancy is identified in the initial dataset, after visualizing a dataset, before training a model, every time a model is being trained, every time the platform receives new data, every time there is an update to the current dataset, repeated based on the generation hyperparameters, every time a new prompt is crafted, in response to receipt of a user request, and/or at any other suitable time.

The synthetic data generated by S500 can be the same or different modality as the data in the initial dataset. For example, the synthetic data can be or include: video, a 3D representation of the scene (e.g., with dynamic elements), point clouds, radar, images, and/or any other suitable data type. In specific examples, the synthetic data can include videos of the scene, text describing the missing data, images, audio, lidar data, 3d models, datasets, interactive simulations, augmented reality (AR) content, and/or any other suitable synthetic data.

The synthetic dataset can be specific to a scene or include multiple scenes. The synthetic data can be pre-labeled with feature values (e.g., object detections, trajectories, etc.), or be unlabeled.

The synthetic data can be labeled with a set of risk scores, wherein the risk scores can be generated alongside the synthetic data by the data generation model or be determined using a subsequent risk scoring architecture. The set of risk scores can include one or more of: inherent scene risk stemming from the combination of static scene elements, inherent per-agent risk, dynamic scene risk given the combination of agents and their respective attributes, scene risk relative to an agent within the scene, and/or any other suitable risk score. The risk score can additionally or alternatively include risk components, such as a severity score or probability score.

The data generation model used in S500 can be a deep neural network (DNN), CNN, transformer, generative adversarial networks (GANs), variational autoencoders (VAEs), LLMs, autoregressive models, normalizing flows, diffusion models, and/or any other suitable model type. The data generation model can include attention mechanisms, recurrence layers, convolutional layers, and/or other mechanisms. The data generation model can be a generative model, and/or any other suitable model type. The data generation model preferably uses self-attention mechanisms, but can additionally or alternatively use recurrence mechanisms, convolutional layers, and/or any other suitable mechanisms. The data generation model used in S500 can be selected based on: the generated prompt (e.g., from S400), the data characteristics (e.g., from S300), the scene representation (e.g., from S100), the model's capabilities, and/or any other suitable factors. For example, a transformer model can be selected when the initial dataset is missing video data, while a diffusion model can be selected when the initial dataset is missing image data. However, the data generation model can be otherwise selected.

In a first variant, S500 can include prompting the data generation model with the prompt to generate synthetic data using the scene representation (e.g., wherein the prompt and the scene representation are provided to the data generation model). An example prompt can include "please generate 10 videos of a cat crossing the street at angles between 0 degrees and 90 degrees with a speed between .01 mi/hr and 10 mi/hr, using the attached scene".

In a second variant, S500 can include single-shot prompting wherein the data generation model (e.g., DNN) is provided the automatically generated prompt from S400 with minimal or no additional context.

In a third variant, S500 can include multi-shot prompting wherein the model (e.g., DNN) is provided with multiple related examples (e.g., from the initial dataset, from prior method instances, generated by other models, etc.) to guide the model by illustrating different aspects of the desired output.

In a fourth variant, S500 can include multi-modality prompting wherein the model is provided with additional contextual information (e.g., a scene graph to represent relationships between objects in the driving environment).

In a fifth variant, S500 can include assigning the model a specific role or perspective and asking it to generate a synthetic video to represent or reflect the given role.

In a sixth variant, S500 can include multi-part requests wherein the model is instructed to first break down the request into multiple specific components before generating the output (e.g., synthetic data).

However, S500 may be otherwise performed.

Processing the synthetic data S600 functions to detect, remove and minimize unrealistic synthetic data outputs. S600 can be performed by a platform, a user, a validation model, and/or by any other suitable entity. S600 can be performed after S500, before S700, and/or at any other suitable time. S600 can be performed for each piece of synthetic data, for randomly selected pieces of synthetic data, or in any other suitable manner.

Processing the synthetic data can include analyzing, detecting, labeling, cleaning, removing, and/or otherwise processing the synthetic data.

In variants, S600 can include analyzing the synthetic data for realism.

In a first variant, the synthetic data is analyzed for by a user (e.g., labeled by an expert).

In a second variant, the synthetic data is analyzed for temporal consistency. This can ensure that each frame in the synthetic video is consistent with its predecessors and successors (e.g., smooth transitions in motion, logical changes in object states, consistent interactions between vehicles, pedestrians, and the environment). In a first example, the synthetic data can be temporally analyzed by: extracting a timeseries of features (e.g., element attributes) from each frame of the synthetic data (e.g., velocity, trajectory, etc.) and evaluating the feature timeseries against a set of heuristics or models. Examples of features that can be analyzed can include vehicle speed, acceleration, object movement, and environmental changes (e.g., lighting, weather).

In a second example, the synthetic data can be temporally analyzed by evaluating the temporal cohesion (e.g., ensure that changes in objects or environments occur gradually rather than instantaneously) of the synthetic data. This can be performed by determining whether feature value changes are smooth and/or change less than a threshold amount between frames.

In a third example, the synthetic data can be temporally analyzed by predicting a subsequent feature value and evaluating whether a value for the feature that was extracted from the subsequent frame substantially matches the predicted attribute value.

In a fourth example, the synthetic data can be analyzed for inconsistencies in visual, audio, motion, actions (e.g., kinematics), and/or other data.

However, the synthetic data can be otherwise temporally analyzed.

In a third variant, analyzing the synthetic data for realism can include instructing a validation model (e.g., LLM, GPT, visual model, etc.) to evaluate the synthetic video. In a first example the validation model is instructed to compare the synthetic video to the text-based prompt for alignment. In a second example the validation model is instructed to evaluate whether the synthetic data is realistic, whether the synthetic data exhibits a realistic aspect (e.g., realistic pedestrian stride, realistic vehicle driving, etc.), and/or perform any other suitable evaluation. In a third example, the validation model is instructed to compare the synthetic video to the scene representation for alignment.

In a fourth variant, analyzing the synthetic data for realism can include cross-data validation. In a first example, the synthetic data is validated against real-world data (e.g., from S100, web-scraped data, etc.). In a second example, the synthetic data is validated by checking if the visual aspects (e.g., audio, visual, lighting, object behavior, etc.) in the synthetic videos match those in real-world footage (e.g., whether the distribution of visual aspects within the synthetic data substantially match the real-world data). For example, the audio-visual features of the synthetic video can be cross-validating against audio-visual features of historical data. In a third example, the synthetic data is validated by analyzing how well the AV's responses in the synthetic scenarios align with actual driving behaviors observed in real data.

In a fifth variant, analyzing the synthetic data for realism can include extracting features from each synthetic data frame, predicting the feature value for the next data frame based on the feature value from a prior data frame (e.g., using a physics-based model, etc.), determining a realism score based on a comparison between the predicted and extracted feature value for the next data frame (e.g., with low realism scores corresponding to large mismatches between the predicted and extracted feature values), and regenerating or discarding synthetic data with realism scores lower than a predetermined threshold.

However, the synthetic data can be otherwise analyzed.

Figure 3:
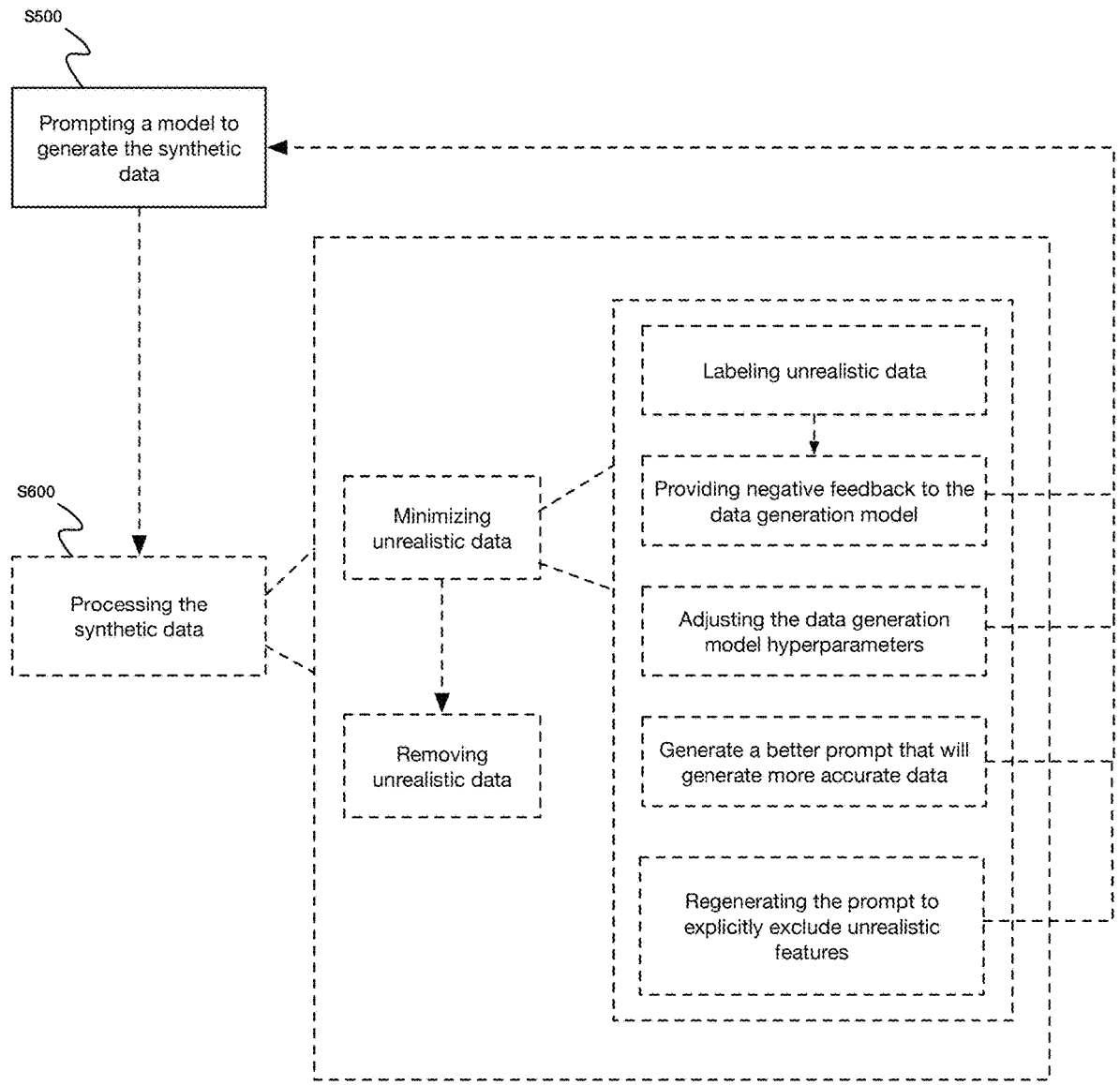
FIG. 3 is a schematic representation of a variant of minimizing hallucination in generated synthetic data.

Processing the synthetic data S600 can additionally or alternatively include minimizing unrealistic data. The unrealistic data can be: labeled and provided as negative feedback to the data generation model (e.g., for model finetuning, contextual prompting, etc.); used to adjust the data generation model hyperparameters (e.g., temperature, etc.); used to regenerate the prompt (e.g., to explicitly exclude unrealistic features); used to generate a better prompt that will generate more accurate data (e.g., by providing the prompt, the prompt content, a summary of the unrealistic synthetic data, the unrealistic synthetic data, an example of synthetic data, and/or other information to a secondary model, such as an LLM, and instructing the secondary model to generate a prompt that will reduce the unrealism in the synthetic data); removed; and/or otherwise managed (e.g., example shown in FIG. 3).

However, S600 may be otherwise performed.

Training a controller using the synthetic data S700 functions to train a more robust controller (e.g., more accurate, more precise, higher confidence, etc.) than would have been possible with only the initial dataset. The controller can be a model (e.g., autonomous vehicle model), a user (e.g., teleoperator), and/or any other suitable controller. In a first example, the AV model can be trained on the synthetic data (e.g., using backpropagation, gradient descent, etc.). In a second example, the teleoperator can be instructed to make teleoperation decisions based on the synthetic data.

S700 can be performed by a platform. S700 can be performed periodically, every time synthetic data is produced, before feeding model(s) synthetic data, after synthetic data has been generated, when a controller metric surpasses below a threshold (e.g., accuracy below a threshold, accident rate rises above a threshold, etc.), and/or at any other suitable time.

The controller can be trained on the generated synthetic data, initial dataset, scene representation, raw sensor data, historical data, user inputs, and/or any other suitable data.

The controller can be specific to a scene or generic across scenes. When specific to a scene, the controller can be trained on a synthetic dataset specific to the scene, an initial dataset specific to the scene, and/or any other data specific to the scene. The synthetic dataset specific to the scene can be generated using a scene representation of the scene (e.g., only the scene representation of the scene), be generated using scene representations of other scenes, be generated without using scene representations (e.g., allowing the data generation model to generate its own scene), and/or be generated in any other suitable manner. In examples, the system can include a plurality of controllers, each associated with a different geolocation (e.g., scene) along a predetermined route.

The autonomous vehicle (AV) model can include behavioral models (e.g., action model, finite state machines, behavior trees, reinforcement learning models, etc.; trained to predict a driving action or decision, or to predict behaviors of other elements in the environment, etc.), perception models (e.g., CNNs, lidar processing models, camera-based models), localization and mapping (e.g., trajectory planner, slam, particle filters, Kalman filters), path planning models (e.g., graph-based algorithms, RRT, model predictive control), control models (e.g., PID controllers, adaptive control systems, neural network controllers), simulation models (e.g., gazebo, carla, sumo, etc.), multi-agent models (e.g., cooperative driving models, game theory models), data-driven models (e.g., deep learning models, generative adversarial networks, etc.), and/or any other suitable models.

In examples, the AV models can be similar to those disclosed in U.S. application Ser. No. 18/225,319 filed 24 Jul. 2023, U.S. application Ser. No. 18/654,315 filed 3 May 2024, and/or U.S. application Ser. No. 18/096,695 filed 13 Jan. 2023, each of which is incorporated herein in their entireties by this reference.

However, S700 may be otherwise performed.

Controlling a vehicle using the AV model S800 functions to operate a vehicle autonomously or semi-autonomously using the trained controller. S800 can control the vehicle in a simulated scene, a real-world scene (e.g., during vehicle traversal through the scene), and/or any other suitable scene.

In variants, S800 can include: sampling data of the scene; optionally selecting a trained AV model (e.g., based on the location, wherein the AV model is specific to the location); determining (e.g., predicting, inferring, etc.) control behavior for the vehicle using the trained AV model based on the sampled data; and controlling the vehicle according to the control behavior.

However, S800 may be otherwise performed.

Specific example 1 includes a method, comprising: determining a scene representation of a real-world scene; determining an initial dataset comprising measurements of the real-world scene; determining a set of underrepresented features in the initial dataset; and for an underrepresented feature of the set of underrepresented features: determining a text-based prompt based on the underrepresented feature, prompting a generative model to generate a set of synthetic videos based on the scene representation and the text-based prompt, and training a controller based on the set of synthetic videos, wherein the trained controller controls operation of an autonomous vehicle (AV) within the real-world scene. In a variant of this specific example, the scene representation can comprise a graph representation of static elements within the real-world scene. In a variant of this specific example, the set of underrepresented features can comprise features with statistically less representation in the dataset. In a variant of this specific example, identifying the set of underrepresented features can comprise: determining a distribution of values for each feature extracted from the initial dataset; and identifying underrepresented feature values based on the distributions. In a variant of this specific example, identifying the set of underrepresented features can comprise: determining correlations between different features extracted from the initial dataset; wherein the set of underrepresented features comprise highly correlated features. In a variant of this specific example, the text-based prompt can be generated based on a name for the underrepresented feature and values for the underrepresented feature. In a variant of this specific example, the generative model can comprise a diffusion model. In a variant of this specific example, the controller can comprise a behavior model. In a variant of this specific example, the synthetic dataset is specific to the real-world scene. In a variant of this specific example, the real-world scene is associated with a geolocation, wherein the controller is specific to the geolocation. In a variant of this specific example, the method further comprises repeating the method for each of a plurality of real-world scenes along a predetermined route, wherein the predetermined route is associated with a plurality of controllers. In a variant of this specific example, the method further comprises analyzing the synthetic video to detect unrealism, wherein unrealism can comprise inconsistencies in visual, audio, motion, or actions.

Specific example 2 includes a system comprising: a non-transitory computer-readable medium; and a processing system, comprising a processor, coupled to the non-transitory computer-readable medium, the processing system configured to: determine a scene representation of a real-world scene; determine an initial dataset depicting the real-world scene; determine a set of underrepresented features from the initial dataset; and for an underrepresented feature of the set of underrepresented features: determine a prompt based on the underrepresented feature; prompt a generative model to generate synthetic data using the scene representation and the prompt; and train a controller based on the synthetic data, wherein the trained controller controls autonomous vehicle (AV) operation within the real-world scene. In a variant of this specific example, the set of underrepresented features can comprise features with statistically less representation in the dataset. In a variant of this specific example, the scene representation can comprise a representation of persistent 3D elements within the real-world scene. In a variant of this specific example, the synthetic data is specific to the real-world scene. In a variant of this specific example, the controller is specific to the real-world scene. In a variant of this specific example, during AV operation within the real-world scene, the autonomous vehicle: determines a current geolocation for the autonomous vehicle; selects a controller based on the current geolocation; samples data of a driving context; predicts a next action based on the sampled data, using the controller; and operates according to the next action within the real-world scene. In a variant of this specific example, determining the prompt can comprise automatically filling out a prompt template with a name of the underrepresented feature and underrepresented values for the underrepresented feature. In a variant of this specific example, wherein the initial dataset does not include data for other real-world scenes. An example is shown in FIG. 4.

In variants, the models described herein can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture. The models can extract data features (e.g., feature values, feature vectors, etc.) from the input data, and determine the output based on the extracted features. However, the models can otherwise determine the output based on the input data.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label), unlabeled data, positive training sets (e.g., a set of data with true positive labels, negative training sets (e.g., a set of data with true negative labels), and/or any other suitable set of data.

Any model can optionally be validated, verified, reinforced, calibrated, or otherwise updated based on newly received, up-to-date measurements; past measurements recorded during the operating session; historic measurements recorded during past operating sessions; or be updated based on any other suitable data.

All references cited herein are incorporated by reference in their entirety, except to the extent that the incorporated material is inconsistent with the express disclosure herein, in which case the language in this disclosure controls.

Optional elements, which can be included in some variants but not others, are indicated in broken line in the figures.

Different subsystems and/or modules discussed above can be operated and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAM, ROM, flash memory, EEPROM, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUs, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A method performed by a processing system comprising a processor, comprising:
   determining a scene representation of a real-world scene;
   determining an initial dataset comprising measurements of the real-world scene;
   determining a set of underrepresented features in the initial dataset, comprising:
      determining a distribution of values for each feature extracted from the initial dataset; and
      identifying underrepresented feature values based on the distributions;
   for an underrepresented feature of the set of underrepresented features:
      determining a text-based prompt based on the underrepresented feature;
      prompting a generative model to generate a set of synthetic videos based on the scene representation and the text-based prompt;
      training a controller based on the set of synthetic videos; and
   controlling operation of an autonomous vehicle (AV) within the real-world scene using the trained controller.

2. The method of claim 1, wherein the scene representation comprises a graph representation of static elements within the real-world scene.

3. The method of claim 1, wherein the set of underrepresented features comprises features with statistically less representation in the dataset.

4. The method of claim 1, wherein identifying the set of underrepresented features comprises:
   determining correlations between different features extracted from the initial dataset;
   wherein the set of underrepresented features comprise highly correlated features.

5. The method of claim 1, wherein the text-based prompt is generated based on a name for the underrepresented feature and values for the underrepresented feature.

6. The method of claim 1, wherein the generative model comprises a diffusion model.

7. The method of claim 1, wherein the controller comprises a behavior model.

8. The method of claim 1, wherein the synthetic dataset is specific to the real-world scene.

9. The method of claim 1, wherein the real-world scene is associated with a geolocation, wherein the controller is specific to the geolocation.

10. The method of claim 9, further comprising repeating the method for each of a plurality of real-world scenes along a predetermined route, wherein the predetermined route is associated with a plurality of controllers.

11. The method of claim 1, further comprising analyzing the synthetic video to detect unrealism, wherein unrealism comprises inconsistencies in visual, audio, motion, or actions.

12. A system comprising:
   a non-transitory computer-readable medium; and
   a processing system, comprising a processor, coupled to the non-transitory computer-readable medium, the processing system configured to:
      determine a scene representation of a real-world scene;
      determine an initial dataset depicting the real-world scene;
      determine a set of underrepresented features from the initial dataset; and
      for an underrepresented feature of the set of underrepresented features:
         determine a prompt based on the underrepresented feature;
         prompt a generative model to generate synthetic data using the scene representation and the prompt; and
         train a controller based on the synthetic data; and
   an autonomous vehicle controlled using the trained controller, wherein the autonomous vehicle:
      determines a current geolocation for the autonomous vehicle;
      selects the trained controller based on the current geolocation;

samples data of a driving context;
predicts a next action based on the sampled data, using the trained controller; and
operates according to the next action within the real-world scene.

13. The system of claim 12, wherein the set of underrepresented features comprises features with statistically less representation in the dataset.

14. The system of claim 12, wherein the scene representation comprises a representation of persistent 3D elements within the real-world scene.

15. The system of claim 12, wherein the synthetic data is specific to the real-world scene.

16. The system of claim 12, wherein the controller is specific to the real-world scene.

17. The system of claim 12, wherein determining the prompt comprises automatically filling out a prompt template with a name of the underrepresented feature and underrepresented values for the underrepresented feature.

18. The system of claim 12, wherein the initial dataset does not include data for other real-world scenes.

19. A method performed by a processing system comprising a processor-, comprising:
determining a scene representation of a real-world scene;
determining an initial dataset comprising measurements of the real-world scene;
determining a set of underrepresented features in the initial dataset;
for an underrepresented feature of the set of underrepresented features:
determining a text-based prompt based on the underrepresented feature, wherein the text-based prompt is generated based on a name for the underrepresented feature and values for the underrepresented feature;
prompting a generative model to generate a set of synthetic videos based on the scene representation and the text-based prompt; and
training a controller based on the set of synthetic videos; and
controlling operation of an autonomous vehicle (AV) within the real-world scene using the trained controller.

* * * * *

UNITED STATES PATENT AND TRADEMARK OFFICE
CERTIFICATE OF CORRECTION

PATENT NO. : 12,361,689 B1
APPLICATION NO. : 18/975322
DATED : July 15, 2025
INVENTOR(S) : Amir Yazdani et al.

Page 1 of 1

It is certified that error appears in the above-identified patent and that said Letters Patent is hereby corrected as shown below:

In the Claims

Column 18, Line 2, In Claim 19, delete "processor-," and insert --processor,-- therefor Column 18, Line 16, In Claim 19, after "prompt;", delete "and"

Signed and Sealed this
Nineteenth Day of August, 2025

Coke Morgan Stewart
*Acting Director of the United States Patent and Trademark Office*